United States Patent [19]

Satoh

[11] Patent Number: 5,083,495
[45] Date of Patent: Jan. 28, 1992

[54] BRAKE BOOSTER WITH ONE-WAY VALVE ON CENTERPLATE

[75] Inventor: Atushi Satoh, Saitama, Japan

[73] Assignee: Jidosha Kiki Co., Ltd., Tokyo, Japan

[21] Appl. No.: 479,943

[22] Filed: Feb. 14, 1990

[30] Foreign Application Priority Data

Apr. 11, 1989 [JP] Japan ................. 1-42404[U]

[51] Int. Cl.⁵ .................... F15B 9/10; F01B 19/00
[52] U.S. Cl. ...................... 91/369.2; 91/533; 92/48; 92/98 R
[58] Field of Search ............... 91/369.1, 369.2, 376 R, 91/533; 92/48, 98 D, 98 R, 169.1, 99; 137/853

[56] References Cited

U.S. PATENT DOCUMENTS

| | | | |
|---|---|---|---|
| 3,543,298 | 11/1970 | Rockwell | 91/369.2 X |
| 3,921,501 | 11/1975 | Rosback | 91/422 X |
| 3,958,497 | 5/1976 | Gardner et al. | 92/48 |
| 4,189,033 | 2/1980 | Katsumori | 137/853 X |
| 4,292,887 | 10/1981 | Ohta et al. | 92/99 X |
| 4,399,735 | 8/1983 | Katagiri et al. | 91/369.2 X |
| 4,453,450 | 6/1984 | Horsting | 91/376 R |
| 4,542,680 | 9/1985 | Takeuchi | 91/369.2 |
| 4,560,326 | 12/1985 | Seki | 92/99 X |
| 4,738,186 | 4/1988 | Rossigno et al. | 92/98 D |
| 4,787,292 | 11/1988 | Tsuyuki et al. | 91/369.3 |
| 4,800,799 | 1/1989 | Nishii | 91/376 R X |
| 4,898,081 | 2/1990 | Fecher | 91/369.1 X |

FOREIGN PATENT DOCUMENTS 2093136 8/1982 United Kingdom ............ 92/98 D

Primary Examiner—Edward K. Look
Assistant Examiner—John Ryznic
Attorney, Agent, or Firm—Flynn, Thiel, Boutell & Tanis

[57] ABSTRACT

A brake booster includes a center plate disposed within a shell. A seal member is provided to interrupt a communication between a variable and a constant pressure chamber which are located across the center plate. The seal member is formed with a lip, acting as a check valve which releases to the variale pressure chamber any pressure developed in the constant pressure chamber which is to be sealed by the seal member and which rises above the pressure in the variable pressure chamber.

4 Claims, 2 Drawing Sheets

BRAKE BOOSTER WITH ONE-WAY VALVE ON CENTERPLATE

FIELD OF THE INVENTION

The invention relates to a brake booster, and more particularly, to a brake booster including a center plate disposed within a shell.

DESCRIPTION OF THE PRIOR ART

A brake booster is known in the art including a center plate which divides the interior of a shell into a front and a rear chamber, a valve body slidably extending through the center plate, a front diaphragm applied to the back surface of a front power piston disposed on the valve body for dividing the interior of the front chamber into a constant and a variable pressure chamber, a rear diaphragm applied to the back surface of a rear power piston mounted on the valve body for dividing the interior of the rear chamber into a constant and a variable pressure chamber, and a seal member disposed on the center plate for hermetically sealing between the center plate and the valve body and for interrupting a communication between the variable and the constant pressure chamber located across the center plate.

When the described brake booster is connected to a master cylinder, the decompression of the master cylinder takes place by causing the input shaft to move forward to thereby operate the brake booster without introducing a negative pressure into the constant pressure chamber of the brake booster. If the input shaft is allowed to move forward rapidly, the volume in the constant pressure chamber decreases rapidly while the volume in the variable pressure chamber increases rapidly, causing the pressure in the respective constant pressure chambers to rise temporarily above the pressures in the respective variable pressure chambers. Consequently, each diaphragm dividing between the constant and the variable pressure chamber is driven into the constant pressure chamber which exhibits a lower pressure, whereby it may be spaced from the rear surface of the diaphragm plate. When the respective diaphragms are brought into close contact with the rear surface of the diaphragm plate subsequently, part of the diaphragm may be disadvantageously held in a biting manner between the diaphragm and the diaphragm plate.

SUMMARY OF THE INVENTION

In view of the foregoing, in accordance with the invention, a seal member which interrupts a communication between a variable and a constant pressure chamber across the center plate is formed with a lip, which acts as a check valve releasing to the variable pressure chamber any pressure which will be developed within the constant pressure that is to be sealed by the seal member and which rises above the pressure of the variable pressure chamber.

With this arrangement, when the input shaft is driven forward for purpose of the decompression, the pressure in the constant pressure chamber is allowed to find its way into the variable pressure chamber through the lip, thus preventing a pressure differential between the constant and the variable pressure chamber from increasing and thus preventing part of the diaphragm from being held bitingly between itself and the diaphragm plate in a favorable manner.

Above and other objects, features and advantages of the invention will become apparent from the following description of several embodiments thereof with reference to the attached drawings.

DETAILED DESCRIPTION OF EMBODIMENTS

Figure 1:
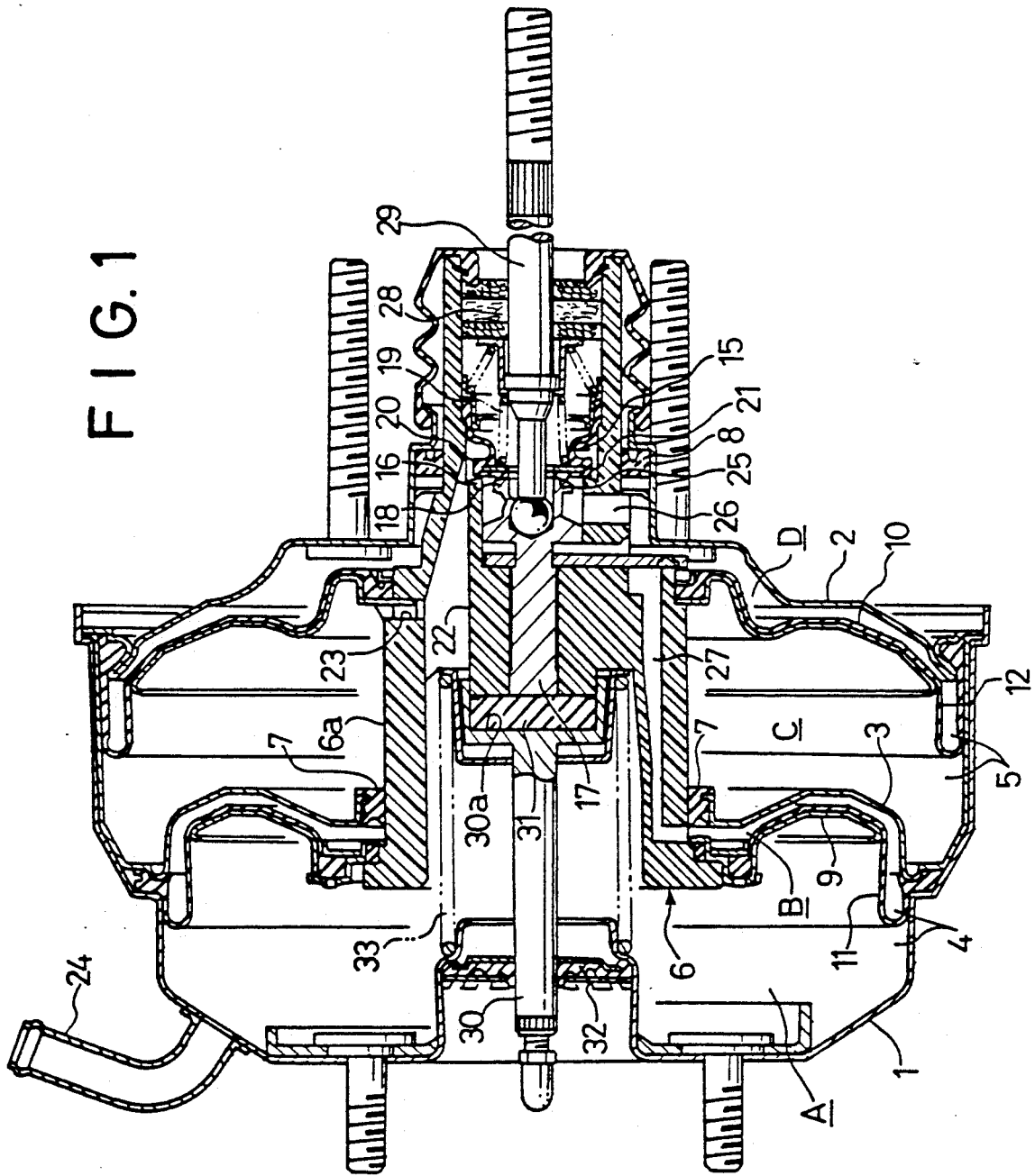
FIG. 1 is a longitudinal section, partly in elevation, of one embodiment of the invention.

Referring to the drawings, several embodiments will now be described. In FIG. 1, an enclosed vessel is defined by a front shell 1 and a rear shell 2, and the interior of the vessel is divided by a center plate 3, which is centrally disposed therein, into a front chamber 4 and a rear chamber 5 which are located across the plate 3. A substantially cylindrical valve body 6 slidably extends through axial portions of the rear shell 2 and the center plate 3 and are hermetically sealed by seal members 7, 8.

Connected to the valve body 6 are a front power piston 9 and a rear power piston 10, which are disposed in the front chamber 4 and the rear chamber 5, respectively. A front diaphragm 11 and a rear diaphragm 12 are applied to the back surfaces of the power pistons 9 and 10, respectively, thereby defining a constant pressure chamber A and a variable pressure chamber B across the diaphragm 11 and also defining a constant pressure chamber C and a variable pressure chamber D across the diaphragm 12.

The valve body 6 contains a valve mechanism 15 which switches a fluid circuit between the pair of constant pressure chambers A, C and the pair of variable pressure chambers B, D. Specifically, the valve mechanism 15 comprises an annular, first valve seat 16 defined on the valve body 6, an annular, second valve seat 18 formed on the right end of a valve plunger 17 which slidably extends through the valve body 6, at a location radially inward of the first valve seat 16, and a valve element 20 which may be seated upon either valve seat 16 or 18 from the right, as viewed in FIG. 1, under the resilience of a spring 19.

A space located radially outward of a first annular seat 21 where the valve element 20 engages the first valve seat 16 communicates with the constant pressure chambers A and C through an axial passage 22 and a radial passage 23, both formed in the valve body 6. The constant pressure chamber A communicates with an intake manifold, not shown, through a tubing 24 which is mounted on the front shell 1 for introducing a negative pressure.

On the other hand, a space which is radially inward of the first annular seat 21 and which is radially outward of a second annular seat 25 where the valve element 20 engages the second valve seat 18, or a space located intermediate the both annular seats 21, 25, communicates with the variable pressure chamber D through a radial passage 26 formed in the valve body 6, and the variable pressure chamber D communicates with the variable pressure chamber B through an axial passage 27 formed in the valve body 6. A space located radially inward of the second annular seat 25 communicates with the atmosphere through a filter 28.

The valve plunger 17, which is slidably disposed within the valve body 6, has its right end connected to an input shaft 29 which is in turn mechanically coupled to a brake pedal, not shown. The left end of the valve plunger is disposed in opposing relationship with the right end face of a reaction disc 31 which is received in a recess 30a formed in one end of a push rod 30. The left end of the rod 30 slidably extends through the axial portion of the front shell 1 through a seal member 32 to the outside thereof for connection with the piston of a master cylinder, not shown. It is to be noted that the valve body 6 is normally maintained at its inoperative position shown, by a return spring 33.

Figure 2:
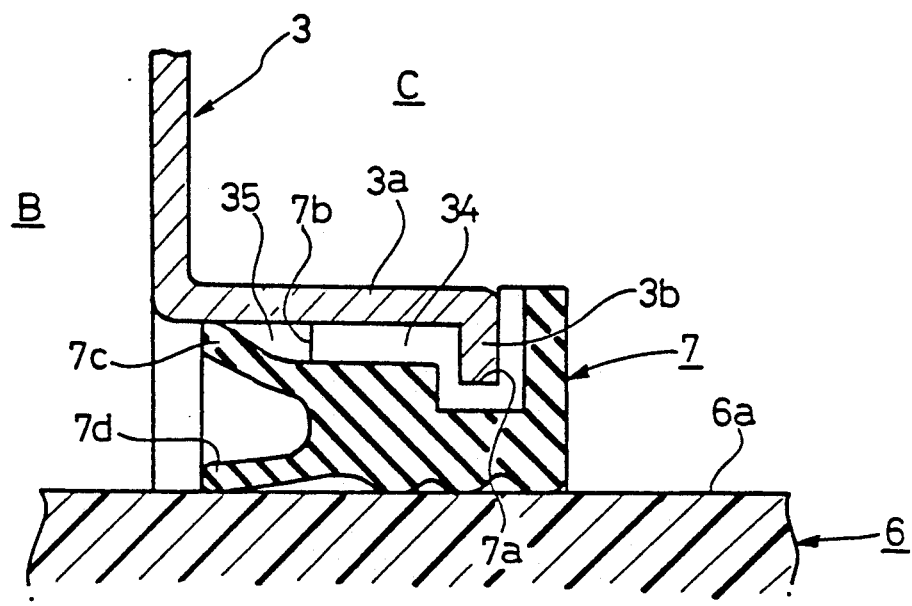
FIG. 2 is an enlarged view of part shown in FIG. 1.

As shown in FIG. 2, in the region of the seal member 7, the inner periphery of the center plate 3 is formed with a cylindrical portion 3a which extends rearwardly by a given length. The rear end of the cylindrical portion 3a is folded radially inward to define a stop 3b for engagement with an annular groove 7a formed in the outer periphery of the seal member 7.

The seal member 7 has a front end face 7b, surrounded by a circumferentially continuing outer peripheral lip 7c which extends in a radially oblique direction to contact the inner peripheral surface of the cylindrical portion 3a, and the front end face 7b is also surrounded around its inner periphery by a similar inner peripheral lip 7d which extends in a radially oblique direction to contact the valve body 6 in a slidable manner.

One or more channels 34 are formed along the outer periphery of the seal member 7, namely, from its end face 7b at a region immediately behind the outer peripheral lip 7c to extend axially along the configuration of the periphery, the channel or channels 34 acting to communicate an annular space 35 defined rearwardly of the outer peripheral lip 7c with the constant pressure chamber C which is defined rearward of the center plate 3.

In the described arrangement, the outer peripheral lip 7c is normally maintained in close contact with the inner peripheral surface of the cylindrical portion 3a by its own resilience, thus preventing a communication between the variable pressure chamber B and the constant pressure chamber C through the channel 34.

When the brake booster is actuated, the atmospheric pressure is introduced into the variable pressure chamber B located forward of the outer peripheral lip 7c, whereby the pressure in the chamber B rises above the pressure of the constant pressure chamber C, causing the pressure differential thereacross to bring the outer peripheral lip 7c into close contact with the inner peripheral surface of the cylindrical portion 3a, again preventing a communication between the variable pressure chamber B and the constant pressure chamber C.

By contrast, during the decompression, if the input shaft 29 is allowed to be advanced rapidly without introducing a negative pressure into the constant pressure chambers A and C, a forward movement of the valve body 6 and the power pistons 9, 10 will cause a rapid reduction in the volume of the constant pressure chambers A, C while the volume of the variable pressure chambers B, D will increase rapidly, resulting in the pressures in the constant pressure chambers A, C which will be momentarily higher than the pressures in the variable pressure chambers B, D.

Thereupon the pressure in the constant pressure chamber C located rearward of the outer peripheral lip 7c will rise above the pressure in the forwardly located variable pressure chamber B, and the pressure differential therebetween causes the lip 7c to be elastically deformed to allow the pressure in the constant pressure chamber C to be released into the variable pressure chamber D.

In this manner, a pressure rise in the constant pressure chamber C is prevented while simultaneously preventing a reduction in the pressure of the variable pressure chamber B. Thus, a pressure differential between the chambers A and B as well as between the chambers C and D is maintained low, with consequence that a pressure differential between the respective constant pressure chambers A, C and the variable pressure chambers B, D cannot cause the diaphragms 11, 12 to be extruded to cause part of these diaphragms to be trapped between themselves and the diaphragm plate as experienced in a conventional brake booster having the seal member which is not provided with the outer peripheral lip 7c.

Figure 3:
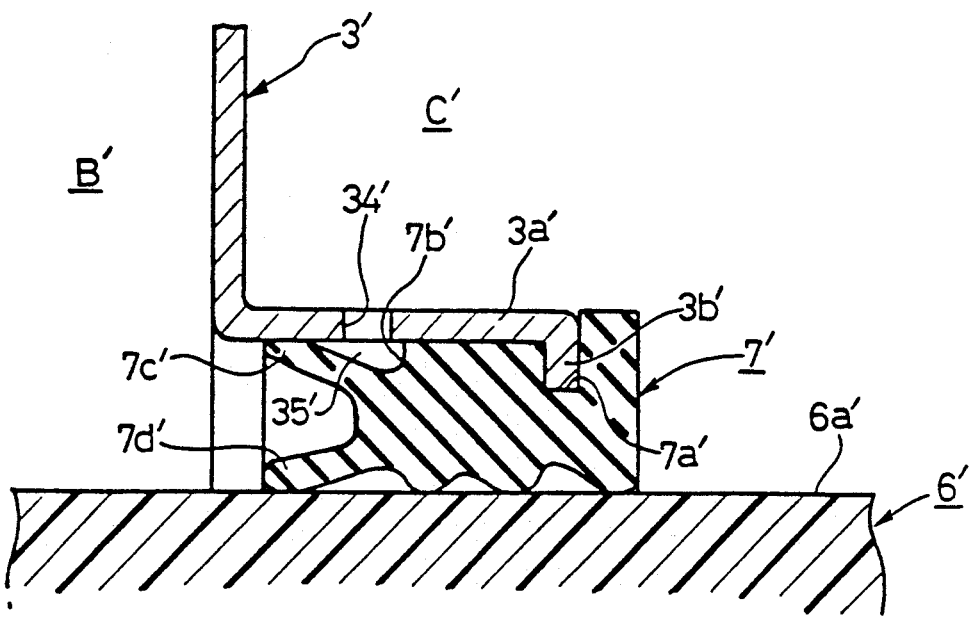
FIG. 3 is a similar enlarged view of another embodiment of the invention.

FIG. 3 shows a second embodiment of the invention where instead of forming the channel 34 in the outer periphery of the seal member 7 as in the first embodiment, a cylindrical portion 3a' of the center plate 3' is formed with a channel 34' which communicates a space 35' located rearward of an outer peripheral lip 7c' with a constant pressure chamber C'. It is to be noted that elements shown in connection with the second embodiment are designated by like reference numerals as used before with a prime. It will be apparent that a similar functioning is achieved in this second embodiment as achieved in the first embodiment.

In the two embodiments described above, the invention has been applied to a tandem brake booster including a single center plate in a shell. However, the invention is equally applicable to a brake booster of triple type in which a pair of center plates are disposed in a shall.

While the invention has been disclosed above in connection with several embodiments thereof, it should be understood that a number of changes, modifications and substitutions will readily occur to one skilled in the art from the above disclosure without departing from the scope and spirit of the invention defined by the appended claims.

What is claimed is:

1. A brake booster including a center plate which divides the interior of a shell into a front and a rear chamber, a valve body slidably extending through the center plate, a front diaphragm applied to the back surface of a front piston which is disposed on the valve body for dividing the interior of the front chamber into a constant and a variable pressure chamber, a rear diaphragm applied to the back surface of a rear piston mounted on the valve body for dividing the interior of the rear chamber into a constant and a variable pressure chamber, and a seal member mounted on the center plate for hermetically sealing between the center plate and the valve body and for interrupting a communication between the variable and the constant pressure chambers located across the center plate;

characterized by a lip formed on the seal member and acting as a check valve which releases the last-mentioned variable pressure chamber any pressure developed in the last-mentioned constant pressure chamber which is to be sealed by the seal member and which rises above the pressure in the last-mentioned variable pressure chamber, an axial portion of the center plate being formed with a cylindrical portion which extends rearwardly, said lip being formed on a front end face of the seal member and contacting the inner peripheral surface of the cylindrical portion to define a space rearward of the lip, and the space communicating with the last-mentioned constant pressure chamber through a channel.

2. A brake booster according to claim 1 in which the channel is formed in the seal member.

3. A brake booster according to claim 1 in which the channel is formed in the cylindrical portion.

4. A brake booster according to claim 1 in which a rear end of the cylindrical portion is folded radially inward to be engaged with an annular groove which is formed in the seal member, thus securing the seal member to the cylindrical portion.

* * * * *